US011588525B2

(12) United States Patent
Qiang et al.

(10) Patent No.: US 11,588,525 B2
(45) Date of Patent: Feb. 21, 2023

(54) ADAPTIVE CO-PHASING FOR BEAMFORMING USING CO-PHASING MATRICES FOR WIRELESS COMMUNICATIONS

(71) Applicant: Telefonaktiebolaget LM Ericsson (publ), Stockholm (SE)

(72) Inventors: Yongquan Qiang, Ottawa (CA); Ali Afana, Kanata (CA); Jianguo Long, Kanata (CA); Ahmed Nouah, Ottawa (CA); Chaocheng Tu, Kanata (CA)

(73) Assignee: Telefonaktiebolaget LM Ericsson (Publ) Stockholm, Stockholm (SE)

( * ) Notice: Subject to any disclaimer, the term of this patent is extended or adjusted under 35 U.S.C. 154(b) by 108 days.

(21) Appl. No.: 17/263,286

(22) PCT Filed: Aug. 2, 2018

(86) PCT No.: PCT/IB2018/055826
§ 371 (c)(1),
(2) Date: Jan. 26, 2021

(87) PCT Pub. No.: WO2020/026004
PCT Pub. Date: Feb. 6, 2020

(65) Prior Publication Data
US 2021/0218445 A1    Jul. 15, 2021

(51) Int. Cl.
*H04B 7/0456*  (2017.01)
*H04B 7/06*  (2006.01)
*H04B 7/10*  (2017.01)

(52) U.S. Cl.
CPC ......... *H04B 7/0469* (2013.01); *H04B 7/0617* (2013.01); *H04B 7/0682* (2013.01); *H04B 7/10* (2013.01)

(58) Field of Classification Search
CPC .. H04B 7/0456; H04B 7/0478; H04B 7/0639; H04B 7/0469; H04B 7/065
See application file for complete search history.

(56) References Cited

U.S. PATENT DOCUMENTS

| 2012/0287799 A1* | 11/2012 | Chen | H04B 7/0626 370/252 |
| 2013/0223549 A1* | 8/2013 | Tong | H04B 7/0639 375/260 |
| 2016/0028463 A1* | 1/2016 | Wang | H04L 5/0046 370/329 |

FOREIGN PATENT DOCUMENTS

| WO | 2014198037 A1 | 12/2014 |
| WO | 2017078497 A1 | 5/2017 |
| WO | 2018029645 A2 | 2/2018 |

OTHER PUBLICATIONS

International Search Report and Written Opinion dated May 9, 2019 for International Application No. PCT/IB2018/055826 filed on Aug. 2, 2018, consisting of 9-pages.
(Continued)

*Primary Examiner* — Ayaz R Sheikh
*Assistant Examiner* — Debebe A Asefa
(74) *Attorney, Agent, or Firm* — Christopher & Weisberg, P. A.

(57) ABSTRACT

A network node, wireless device and methods for co-phasing for beamforming using co-phasing matrices for wireless communications are provided. In one example, a network node for co-phasing in beamforming for transmissions is provided. The network node includes processing circuitry including a processor and a memory where the memory contains instructions executable by the processor to configure the network node to: obtain co-phasing information associated with a wireless device, generate at least two co-phasing matrices based on the co-phasing information,
(Continued)

and apply the at least two co-phasing matrices to at least two resource structures.

21 Claims, 5 Drawing Sheets

(56) References Cited

OTHER PUBLICATIONS

3Gpp TS 36.213 V14.2.0; 3rd Generation Partnership Project; Technical Specification Group Radio Access Network; Evolved Universal Terrestrial Radio Access (E-UTRA); Physical layer procedures (Release 14); Mar. 2017, consisting of 454-pages.

* cited by examiner

ADAPTIVE CO-PHASING FOR BEAMFORMING USING CO-PHASING MATRICES FOR WIRELESS COMMUNICATIONS

CROSS-REFERENCE TO RELATED APPLICATIONS

This application is a Submission Under 35 U.S.C. § 371 for U.S. National Stage Patent Application of International Application Number: PCT/IB2018/055826, filed Aug. 2, 2018 entitled "ADAPTIVE CO-PHASING FOR BEAMFORMING USING CO-PHASING MATRICES FOR WIRELESS COMMUNICATIONS," the entirety of which is incorporated herein by reference.

TECHNICAL FIELD

Wireless communication and in particular to applying co-phasing for beamformed transmissions with an active antenna system.

BACKGROUND

Active antenna system (AAS) is one of several technologies included in $4^{th}$ Generation Long Term Evolution (4G LTE) and $5^{th}$ Generation New Radio (5G NR) standards to help enhance the wireless network performance and capacity by using full dimension multiple-input and multiple-output (FD-MIMO) and massive MIMO. Some AAS systems consist of two-dimensional antenna elements array with M rows, N columns and K polarizations (where K=2 in case of cross-polarization) as illustrated in FIG. 1.

The codebook-based precoding in AAS is based on a set of predefined precoding matrices, W. The precoding matrix indication (PMI) may be selected by a wireless device with Downlink Channel State Information Reference Signaling (DL CSI-RS) or by the network node, e.g., eNodeB (eNB) in Long Term Evaluation (LTE), g Node B (gNB) in New Radio (NR), etc., with uplink (UL) reference signals. The precoding matrix W may be further described as, for example, a two-stage precoding structure as follows:

$$W = W_1 W_2 \quad (1)$$

where $W_1$ is the first stage precoding structure and may be described as a codebook and consists essentially of a group of 2D grid-of-beams (GoB). $W_1$ may be characterized as:

$$W_1 = \begin{bmatrix} w_h \otimes w_v & 0 \\ 0 & w_h \otimes w_v \end{bmatrix}$$

where, $w_h$ and $w_v$ are precoding vectors selected from an over-sampled Discrete Fourier Transform (DFT) for a horizontal direction and a vertical direction, respectively, and may be expressed by $$w_v = \frac{1}{\sqrt{M}}\left[1, e^{\frac{j2\pi v}{MO_1}}, \cdots, e^{\frac{j2\pi mv}{MO_1}}, \cdots, e^{\frac{j2\pi(M-1)v}{MO_1}}\right]^T$$

$$w_v = \frac{1}{\sqrt{N}}\left[1, e^{\frac{j2\pi h}{NO_2}}, \cdots, e^{\frac{j2\pi nv}{NO_2}}, \cdots, e^{\frac{j2\pi(N-1)h}{NO_2}}\right]^T$$

where, $O_1$, $O_2$ are the over-sampling rates in vertical and horizontal directions, respectively.

The second stage of the precoding matrix, denoted as $W_2$, is used for beam selection within the group of 2D GoBs as well as the associated co-phasing between two polarizations. Therefore, the AAS performance may not only depend on codebook $W_1$, but may also depend on the co-phasing matrix of $W_2$.

Closed-Loop Co-Phasing

In 3rd Generation Partnership Project (3GPP, a standardization organization), closed-loop co-phasing is defined in multiple-input multiple-output (MIMO) type of "CLASS A" and "TypeI-SinglePanel". That is:

For single layer transmission $$W_2 = \frac{1}{\sqrt{2}}\begin{bmatrix} 1 \\ \varphi_l \end{bmatrix}$$

is used as the single co-phasing matrix. Transmission layer may refer to a spatial layer used during transmission where the number of spatial layers may be limited by the number of antennas at the network node and/or wireless device.

For dual layer transmission $$W_2 = \frac{1}{2}\begin{bmatrix} 1 & 1 \\ \varphi_l & -\varphi_l \end{bmatrix}$$

is used as the single co-phasing matrix, where $\varphi_l$ is the co-phasing factor that may be determined by the wireless device reported wideband or subband co-phasing index l, denoted by $$\varphi_l = e^{j\pi l/2}$$

The co-phasing is based on the wireless device's co-phasing index report. One issue from this arrangement may be that the co-phasing is fixed and might lead to an imbalance among two transmission layers such as a power or gain imbalance between transmission layers. For example, $$W_2 = \frac{1}{2}\begin{bmatrix} 1 & 1 \\ \varphi_l & -\varphi_l \end{bmatrix}$$

is optimized for the first transmission layer and not the second transmission layer such that the first transmission layer may have better performance characteristics (e.g., gain) than the second transmission layer after the co-phasing matrix is applied, thereby leading to poor overall performance. In some cases, a penalty may be applied to the second transmission layer to compensate for the co-phasing matrix "favoring" the first transmission layer, i.e., providing at least one better performance characteristics to the first transmission layer when compared to the second transmission layer.

SUMMARY

Some embodiments advantageously provide a method, system, wireless device and network node for co-phasing for beamforming for transmissions.

One or more embodiments provide a network node, wireless device, systems and methods for co-phasing for beamforming using co-phasing matrices for wireless communications.

According to one aspect, a network node for co-phasing in beamforming for transmissions by a cross-polarization antenna array is provided. The network node includes processing circuitry including a processor and a memory. The memory contains instructions executable by the processor to configure the network node to: obtain co-phasing information associated with a wireless device; generate at least two co-phasing matrices based on the co-phasing information; and apply the at least two co-phasing matrices to at least two resource structures.

According to this aspect, in some embodiments, the co-phasing information is obtained from a co-phasing index report associated with the wireless device. In some embodiments, the co-phasing index report indicates a value of a co-phasing factor used to generate the at least two co-phasing matrices. In some embodiments, the co-phasing information is obtained based on at least one uplink reference signal associated with the wireless device. In some embodiments, a first column of a first matrix of the at least two co-phasing matrices provides higher gain for a first transmission layer than a gain provided by a second column of a first matrix for a second transmission layer, the first transmission layer being different from the second transmission layer. In some embodiments, a second column of a second matrix of the at least two co-phasing matrices provides higher gain for the second transmission layer than the gain provided by a first column of the second matrix for the first transmission layer. In some embodiments, the at least two co-phasing matrices are generated by a phase rotation upon a base matrix formed with a co-phasing factor obtained from the co-phasing information. In some embodiments, the base matrix for single-layer transmission is formed by a 2×1 vector, a first element of which is equal to 1, and a second element of which is equal to the co-phasing factor. In some embodiments, the base matrix for dual-layer transmission is formed by a 2×2 matrix, a first element of a first column being equal to 1, a second element of the first column being equal to the co-phasing factor, a first element of a second column being equal to 1, and a second element of the second column being the negative of the co-phasing factor. In some embodiments, in case of more than two layer transmission, the more than two layers are divided into dual-layer groups for even number of layers, and are divided into dual layer groups plus an additional layer for odd number of layers, and wherein at least two matrices are generated per dual layer group. In some embodiments, if two co-phasing matrices are generated for two layers transmission, columns of the second matrix correspond to interchanged columns of the first matrix. In some embodiments, if four co-phasing matrices are to be generated for two layers transmission, then columns of a third matrix correspond to interchanged columns of a first matrix, and columns of a fourth matrix correspond to interchanged columns of a second matrix. In some embodiments, the applying of the at least two co-phasing matrices to the one of the at least two resource structures includes applying a respective matrix of the at least two co-phasing matrices to one of a respective resource structure of the at least two resource structures. The at least two resource structures are one of at least two physical resource blocks, PRBs, and at least two resource elements, REs In some embodiments, the applying of the at least two co-phasing matrices to at least two resource structures is transparent to the wireless device receiving at least one transmission. In some embodiments, a sequence of applying the at least two co-phasing matrices to one of the at least two resource structures is chosen randomly by the network node. In some embodiments, a granularity of the applying of the at least two co-phasing matrices to the one of the at least two resource structures is indicated to the wireless device receiving at last one transmission. In some embodiments, a sequence of applying the at least two co-phasing matrices to the one of the at least two resources structures is pre-selected for both the network node and the wireless device.

According to another aspect, a method for a network node for co-phasing in beamforming for transmissions by a cross-polarization antenna array is provided. The method includes: obtaining co-phasing information associated with a wireless device; generating at least two co-phasing matrices based on the co-phasing information; and applying the at least two co-phasing matrices to one of at least two resource structures.

According to this aspect, in some embodiments, the co-phasing information is obtained from a co-phasing index report associated with the wireless device. In some embodiments, the co-phasing index report indicates a value of a co-phasing factor used to generate the at least two co-phasing matrices. In some embodiments, the co-phasing information is obtained based on at least one uplink reference signal associated with the wireless device. In some embodiments, a first column of a first matrix of the at least two co-phasing matrices provides higher gain for a first transmission layer than a gain provided by a second column of a first matrix for a second transmission layer, the first transmission layer being different from the second transmission layer. In some embodiments, a second column of a second matrix of the at least two co-phasing matrices provides higher gain for the second transmission layer than the gain provided by a first column of a second matrix for the first transmission layer. In some embodiments, the at least two co-phasing matrices are generated by a phase rotation upon a base matrix formed with a co-phasing factor obtained from the co-phasing information. In some embodiments, the base matrix for single-layer transmission is formed by a 2×1 vector, a first element of which is equal to 1, and a second element of which is equal to the co-phasing factor. In some embodiments, the base matrix for dual-layer transmission is formed by a 2×2 matrix, a first element of a first column being equal to 1, a second element of the first column being equal to the co-phasing factor, a first element of a second column being equal to 1, and a second element of the second column being the negative of the co-phasing factor. In some embodiments, in case of more than two layer transmission, the more than two layers are divided into dual-layer groups for even number of layers, and are divided into dual layer groups plus an additional layer for odd number of layers, and wherein at least two co-phasing matrices are generated per dual layer group. In some embodiments, if two co-phasing matrices are generated for two layers transmission, columns of the second matrix correspond to interchanged columns of the first matrix. In some embodiments, if four co-phasing matrices are to be generated for two layers transmission, then columns of a third matrix correspond to interchanged columns of a first matrix, and columns of a fourth matrix correspond to interchanged columns of a second matrix. In some embodiments, the applying of the at least two co-phasing matrices to the one of the at least two resource structures includes applying a respective matrix of the at least two matrices to one of a respective resource structure of the at least two resource structures. The at least two resource structures are one of at least two physical resource blocks, PRBs, and at least two resource elements, REs. In some embodiments, the applying of the at least two co-phasing matrices to at least two resource structures is transparent to the wireless device receiving at least one transmission. In some embodiments, a sequence of applying the at least two co-phasing matrices to one of the at least two resource structures is chosen randomly by the network node. In some embodiments, a granularity of the applying of the at least two co-phasing matrices to the one of the at least two resource structures is indicated to the wireless device receiving at least one transmission. In some embodiments, a sequence of applying the at least two co-phasing matrices to the one of the at least two resource structures is pre-selected for both the network node and the wireless device.

According to yet another aspect, a wireless device for receiving transmissions is provided. The wireless device includes processing circuitry including a processor and a memory. The memory contains instructions executable by the processor to configure the wireless device to: one of provide co-phasing information and signal at least one uplink reference signal for determining co-phasing information; receive at least one transmission that is based on at least two co-phasing matrices applied to one of at least two resource structures, the at least two co-phasing matrices being based on the one of provided co-phasing information and signaled at least one uplink reference signal; and process the at least one transmission.

According to this aspect, in some embodiments, the provided co-phasing information indicates a value of a co-phasing factor used to generate the at least two co-phasing matrices. In some embodiments, a first column of a first matrix of the at least two co-phasing matrices provides higher gain for a first transmission layer than a gain provided by a second column of the first matrix for a second transmission layer, the first transmission layer being different from the second transmission layer. In some embodiments, a second column of a second matrix of the at least two co-phasing matrices provides higher gain for the second transmission layer than the gain provided by a first column of the second matrix for the first transmission layer. In some embodiments, a respective matrix of the at least two co-phasing matrices is associated with one of a respective resource structure of the at least two resource structures. The at least two resource structures are one of at least two physical resource blocks, PRBs, and at least two resource elements, REs. In some embodiments, the at least two co-phasing matrices are transparent to the wireless device receiving the at least one transmission. In some embodiments, the memory contains further instructions executable by the processor to configure the wireless device to receive an indication of a granularity of the at least two co-phasing matrices with respect to the one of the at least two resource structures.

According to another embodiment, a method for a wireless device for receiving transmissions is provided. The method includes one of providing co-phasing information and signaling at least one uplink reference signal for determining co-phasing information. The method also includes receiving at least one transmission that is based on at least two co-phasing matrices applied to one of at least two resource structures, the at least two co-phasing matrices being based on the one of provided co-phasing information and signaled at least one uplink reference signal. The method further includes processing the at least one transmission.

According to this aspect, in some embodiments, the provided co-phasing information indicates a value of a co-phasing factor used to generate the at least two co-phasing matrices. In some embodiments, a first column of a first matrix of the at least two co-phasing matrices provides higher gain for a first transmission layer than a gain provided by a second column of the first matrix for a second transmission layer, the first transmission layer being different from the second transmission layer. In some embodiments, a second column of a second matrix of the at least two co-phasing matrices provides higher gain for the second transmission layer than the gain provided by a first column of the second matrix for the first transmission layer. In some embodiments, a respective matrix of the at least two co-phasing matrices is associated with one of a respective resource structures of the at least two resource structures. The at least two resource structures are one of at least two physical resource blocks, PRBs, and at least two resource elements, REs. In some embodiments, the at least two co-phasing matrices are transparent to the wireless device receiving the at least one transmission. In some embodiments, the method further includes receiving an indication of a granularity of the at least two co-phasing matrices with respect to the one of the at least two resource structures.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
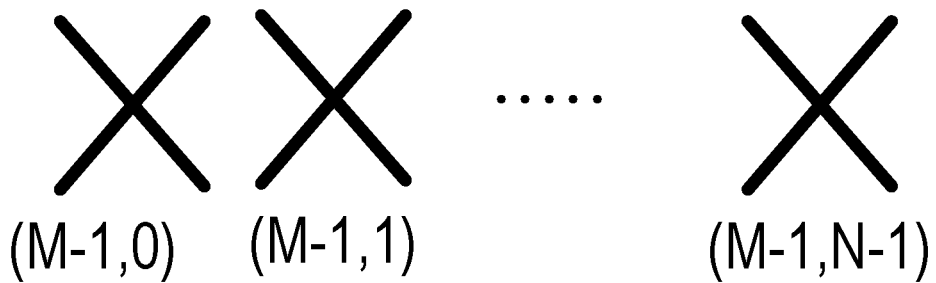
FIG. 1 is a diagram of a two-dimensional cross-polarized antenna element array.
Figure 1:
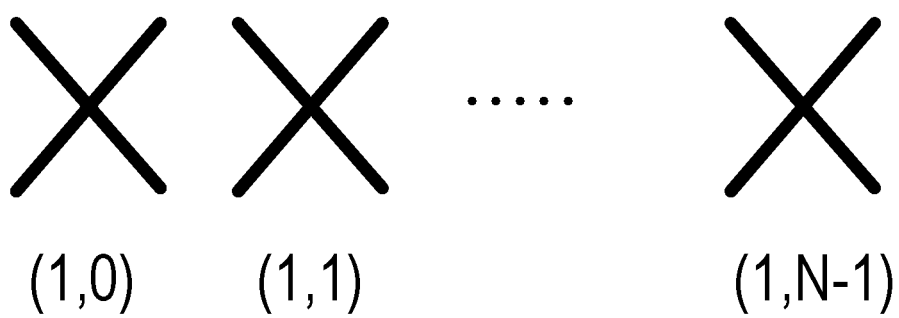
Figure 1:
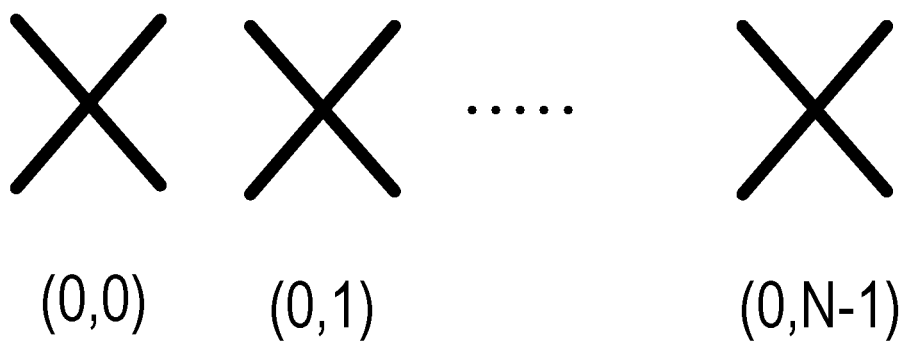

The disclosure helps solve at least some of the problems with existing systems by providing a co-phasing method and arrangements, at least in part, by providing adaptive co-phasing that may be transparent to the wireless device such as transparent in resource structure, e.g., Physical Resource Block (PRB), granularity, and that can be used with wireless devices operating using wireless communication standards such as 3GPP Release 13 and lower. For example, semi-open-loop co-phasing, described below, suffers from fixed co-phasing that may lead to one or more issues.

Semi-Open-Loop Co-Phasing

In 3GPP, a semi-open-loop ("semiOpenLoop") is described as follows specifically for dual-layer transmission:

For dual layer transmission:

$$W_2 = \frac{1}{2}\begin{bmatrix} 1 & 1 \\ \varphi_i & -\varphi_i \end{bmatrix}, \varphi_i = e^{j\pi(i \bmod 2)/2}$$

where $\varphi_i$ is the co-phasing factor determined by a network node (e.g., base station, eNB, gNB, etc.) for the i-th vector of symbols from the transmission layer mapping. That means that:

If $i \mod 2 = 0$ $$W_2 = \frac{1}{2}\begin{bmatrix} 1 & 1 \\ 1 & -1 \end{bmatrix}$$

If $i \mod 2 = 1$ $$W_2 = \frac{1}{2}\begin{bmatrix} 1 & 1 \\ j & -j \end{bmatrix}$$

However, while the network node may determine the co-phasing factor in the semi-open-loop co-phasing, the co-phasing factor is not based on a wireless device's co-phasing index report. Instead, the co-phasing factor in semi-open-loop co-phasing is based on two fixed co-phasing factors toggled in a granularity of per resource structure such as resource element (RE). Some problems that may result from these co-phasing factors are:

1) The co-phasing factors rely on wireless device capability of semi-open-loop co-phasing of particular wireless communication standard(s) such as 3GPP Release 14. Therefore, the co-phasing factors may not be used with wireless devices operating on certain wireless communication standards such as 3GPP Release 13 and lower.
2) The co-phasing factors are equivalent to having two fixed co-phasing factors of 0° and 90°, which may not be adaptive to the phase difference of two polarizations.

Unlike existing systems that rely on fixed co-phasing, the disclosure teaches adaptive co-phasing based on co-phasing information. In one or more examples, the co-phasing is performed in an alternated manner in resource structure granularity such as PRBs or Resource Elements (REs) granularity using an obtained co-phasing factor. Further, the provided co-phasing method/process is adaptive to the real or actual phase difference of two polarizations, i.e., "adaptive" may correspond to taking into account actual phase differences, which may be indicated or based on the co-phasing information. Furthermore, the provided co-phasing method/process helps to balance channel quality among transmission layers to achieve higher overall beamforming gain and better overall performance.

Before describing in detail exemplary embodiments, it is noted that the embodiments reside primarily in combinations of apparatus components and processing steps related to co-phasing for beamforming. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

The term "wireless device" may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., base station, gNB and/or relay station. A downlink direction may refer to a data transfer direction from a network node, e.g., base station, gNB and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells, e.g., a PCell and/or a LA cell.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 2:
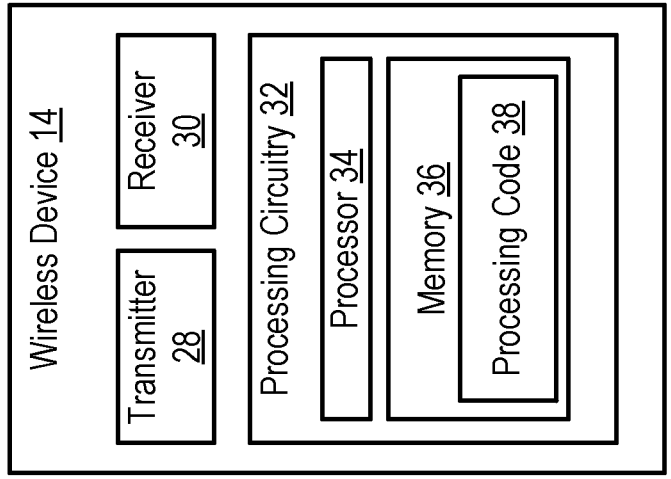
FIG. 2 is an exemplary system for co-phasing for beamforming in accordance with the principles of the disclosure.
Figure 2:
Figure 2:
Figure 2:
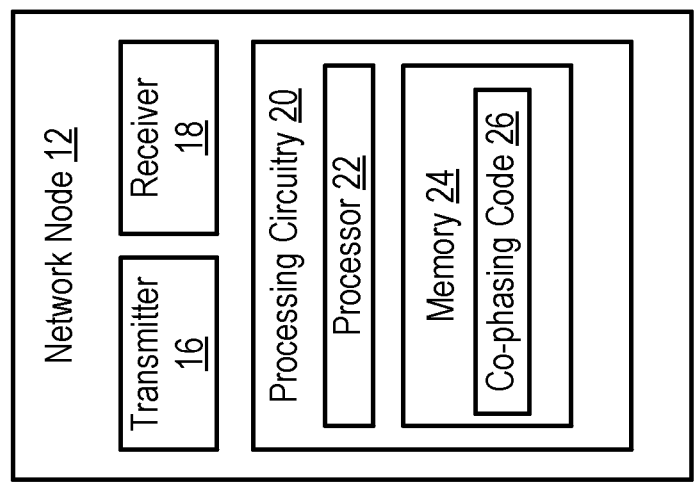

Referring now to drawing figures in which like reference designators refer to like elements, there is shown in FIG. 2 an exemplary system for co-phasing for beamforming. In one or more embodiments, the co-phasing for beamforming is performed in an Active Antenna System (AAS). System 10 includes one or more network nodes 12 and one or more wireless devices 14, in communication with each other via one or more communication networks, paths and/or links using one or more communication protocols such as LTE or NR based protocols.

Network node 12 includes transmitter 16 and receiver 18 for communicating with wireless devices 14, other network nodes 12 and/or other entities in system 10. In one or more embodiments, transmitter 16 and receiver 18 includes or is replaced by one or more communication interfaces.

Network node 12 includes processing circuitry 20. Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or reading from) memory 24, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., data pertaining to communication, e.g., configuration and/or address data of nodes, etc.

Processing circuitry 20 may be configured to control any of the methods and/or processes described herein and/or to cause such methods, signaling and/or processes to be performed, e.g., by network node 12. Processor 22 corresponds to one or more processors 22 for performing network node 12 functions described herein. Network node 12 includes memory 24 that is configured to store data, programmatic software code and/or other information described herein. In one or more embodiments, memory 24 is configured to store co-phasing code 26. For example, co-phasing code 26 includes instructions that, when executed by processor 22, causes processor 22 to perform the signaling describe herein with respect to network node 12.

Wireless device 14 includes transmitter 28 and receiver 30 for communicating with network node 12, other wireless devices 14 and/or other entities in system 10. In one or more embodiments, transmitter 28 and receiver 30 includes or is replaced by one or more communication interfaces.

Wireless device 14 includes processing circuitry 32. Processing circuitry 32 includes processor 34 and memory 36. In addition to a traditional processor and memory, processing circuitry 32 may comprise integrated circuitry for processing and/or control, e.g., one or more processors and/or processor cores and/or FPGAs (Field Programmable Gate Array) and/or ASICs (Application Specific Integrated Circuitry). Processor 34 may be configured to access (e.g., write to and/or reading from) memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 36 may be configured to store code executable by processor 34 and/or other data, e.g., data pertaining to communication, e.g., configuration and/or address data of nodes, etc.

Processing circuitry 32 may be configured to control any of the methods and/or processes described herein and/or to cause such methods, signaling and/or processes to be performed, e.g., by wireless device 14. Processor 34 corresponds to one or more processors 34 for performing wireless device 14 functions described herein. Wireless device 14 includes memory 36 that is configured to store data, programmatic software code and/or other information described herein. In one or more embodiments, memory 36 is configured to store processing code 38. For example, processing code 38 includes instructions that, when executed by processor 34, causes processor 34 to perform the processes described herein with respect to wireless device 14.

Note further that functions described herein as being performed by a wireless device 14 or a network node 12 may be distributed over a plurality of wireless devices 14 and/or network nodes 12. In other words, it is contemplated that the functions of the network node 12 and wireless device 14 described herein are not limited to performance by a single physical device and, in fact, can be distributed among several physical devices locally or across a network cloud such as a backhaul network, core network and/or the Internet.

Figure 3:
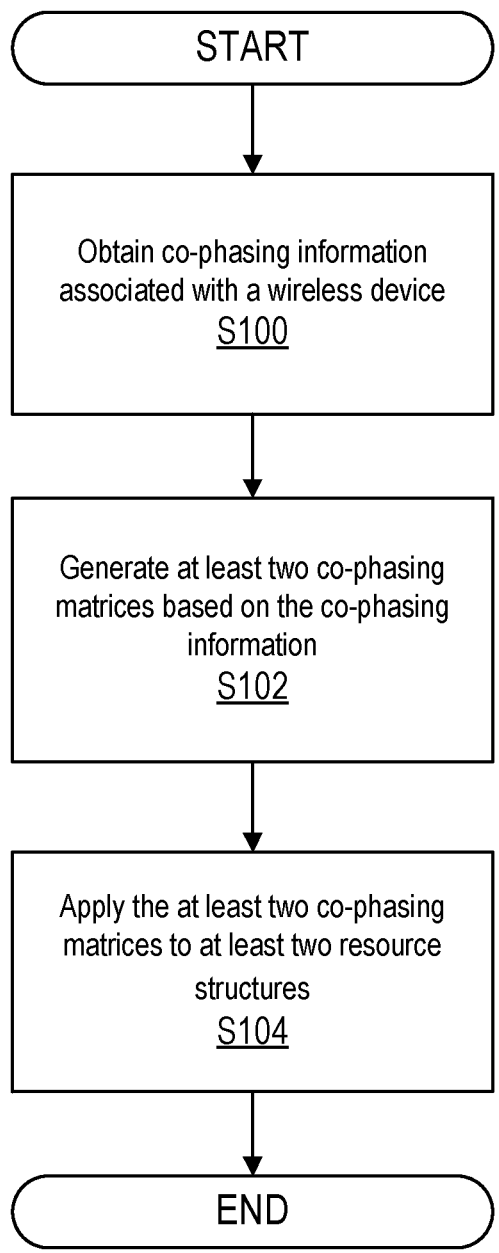
FIG. 3 is a flowchart of an exemplary process in a network node of co-phasing for generating and applying co-phasing matrices in accordance with the principles of the disclosure.

FIG. 3 is a flowchart of an exemplary process in a network node of co-phasing code for generating and applying co-phasing matrices. Processing circuitry 20 is configured to obtain co-phasing information associated with a wireless device 14, as described herein (Block S100). In one or more embodiments, the obtaining of information includes obtaining at least one co-phasing factor as described below. Thus, the information may include at least one co-phasing factor. In one or more embodiments, the co-phasing information is obtained from the wireless device 14, another network node 12 and/or the core network.

Obtaining at Least One Co-Phasing Factor

For wireless devices 14 operating using a wireless standard such as 3GPP Release 13, at least one co-phasing factor may be obtained by network node 12 using the wireless device's co-phasing index report. For wireless devices 14 operating using a wireless device standard such as 3GPP Release lower than Release 13, the at least one co-phasing factor may be estimated at network node 12 (e.g., eNB, gNB, base station, etc.) by using uplink (UL) reference signals (e.g., sounding reference signal, or PUSCH demodulation reference signal) received from wireless device 14. In one or more embodiments, network node 12 uses a wireless device specific reference signal for the estimation of at least one co-phasing factor. For example, network node 12 can estimate the co-phasing factor based on one or more UL references signals received from wireless device 14.

Processing circuitry 20 is configured to generate at least two co-phasing matrices based on the co-phasing information, as described herein (Block S102). For example, the semi-closed-loop co-phasing descried below may be used to generate at least two co-phasing matrices or a set of co-phasing matrices.

Semi-Closed-Loop Co-Phasing

The semi-closed-loop co-phasing method may include generating a set of co-phasing matrices by, in one example, introducing additional phase rotations upon a base matrix constructed from the obtained co-phasing factor expressed by:

In 1-layer transmission:

$$W_2^{(i)} = \frac{1}{\sqrt{2}} \begin{bmatrix} 1 & 0 \\ 0 & e^{j2\pi i/N_c} \end{bmatrix} \begin{bmatrix} 1 \\ \varphi_l \end{bmatrix}$$

In 2-layer transmission:

$$W_2^{(i)} = \frac{1}{2} \begin{bmatrix} 1 & 0 \\ 0 & e^{j2\pi i/N_c} \end{bmatrix} \begin{bmatrix} 1 & 1 \\ \varphi_l & -\varphi_l \end{bmatrix}$$

where $N_c$ is the total number of phase rotations to be applied and $W_2^{(i)}$ are the associated i-th co-phasing matrices.

In one example, two co-phasing matrices for $N_c=2$ are given as follows:

$$W_2^{(0)} = \frac{1}{\sqrt{2}} \begin{bmatrix} 1 & 0 \\ 0 & e^{j2\pi \times 0/2} \end{bmatrix} \begin{bmatrix} 1 & 1 \\ \varphi_l & -\varphi_l \end{bmatrix} = \frac{1}{2} \begin{bmatrix} 1 & 1 \\ \varphi_l & -\varphi_l \end{bmatrix}, \text{ and}$$

$$W_2^{(1)} = \frac{1}{2} \begin{bmatrix} 1 & 0 \\ 0 & e^{j2\pi \times 1/2} \end{bmatrix} \begin{bmatrix} 1 & 1 \\ \varphi_l & -\varphi_l \end{bmatrix} = \frac{1}{2} \begin{bmatrix} 1 & 1 \\ -\varphi_l & \varphi_l \end{bmatrix}$$

In another example, four co-phasing matrices for $N_c=4$ are given as follows:

$$W_2^{(0)} = \frac{1}{2} \begin{bmatrix} 1 & 0 \\ 0 & e^{j2\pi \times 0/4} \end{bmatrix} \begin{bmatrix} 1 & 1 \\ \varphi_l & -\varphi_l \end{bmatrix} = \frac{1}{2} \begin{bmatrix} 1 & 1 \\ \varphi_l & -\varphi_l \end{bmatrix},$$

$$W_2^{(1)} = \frac{1}{2} \begin{bmatrix} 1 & 0 \\ 0 & e^{j2\pi \times 1/4} \end{bmatrix} \begin{bmatrix} 1 & 1 \\ \varphi_l & -\varphi_l \end{bmatrix} = \frac{1}{2} \begin{bmatrix} 1 & 1 \\ j\varphi_l & -j\varphi_l \end{bmatrix},$$

$$W_2^{(2)} = \frac{1}{2} \begin{bmatrix} 1 & 0 \\ 0 & e^{j2\pi \times 2/4} \end{bmatrix} \begin{bmatrix} 1 & 1 \\ \varphi_l & -\varphi_l \end{bmatrix} = \frac{1}{2} \begin{bmatrix} 1 & 1 \\ -\varphi_l & \varphi_l \end{bmatrix}, \text{ and}$$

$$W_2^{(3)} = \frac{1}{2} \begin{bmatrix} 1 & 0 \\ 0 & e^{j2\pi \times 3/4} \end{bmatrix} \begin{bmatrix} 1 & 1 \\ \varphi_l & -\varphi_l \end{bmatrix} = \frac{1}{2} \begin{bmatrix} 1 & 1 \\ -j\varphi_l & j\varphi_l \end{bmatrix}.$$

In case of more than two transmission layers, in one or more embodiments, the transmission layers are divided into several 2-layer groups and possibly one 1-layer group. The co-phasing matrix generation for the 2-layer case and 1-layer case are applied to each transmission layer group accordingly.

While two co-phasing matrices are discussed herein, the disclosure is equally applicable to the generation and use of more than two co-phasing matrices. For example, the quantity of co-phasing matrices that are generated may be based on and/or correspond to a quantity of coefficient factors reported by the wireless device 14. In another example, the quantity of co-phasing matrices that are generated may be based on and/or correspond to the quantity of transmission layers.

Processing circuitry 20 is configured to apply the at least two co-phasing matrices to at least two resource structures (Block S104). In some embodiments, the at least two resource structures includes at least two physical resource blocks (PRBs), at least two resource elements (REs) and/or at least two other wireless communication protocol based structures for at least two radio resources.

In one or more embodiments, the generated co-phasing matrices are applied alternately in a pre-defined granularity (e.g., applied alternately to respective resource structures such as PRBs or REs such that one co-phasing matrix is applied to one PRB and another co-phasing matrix is applied to another PRB, where this pattern continues for one or more PRBs). For example, if the granularity is per PRB, $W_2^{(i)}$ is applied to REs in an i-th scheduled PRB. If the granularity is per RE, $W_2^{(i)}$ is applied to an i-th RE in scheduled PRBs.

When constructing the precoding matrix, $W_2^{(i)}$ may be selected according to the index of PRBs or REs if per PRB or per RE granularity is applied, for example On even PRBs:

$W_2 = W_2^{(0)}$

On Odd PRBs:

$W_2 = W_2^{(1)}$

Note that the sequence of applying the two or more co-phasing matrices may be predefined for both the network node and the wireless device or randomly chosen by the network node if the co-phasing is transparent to the wireless device.

In one or more embodiments, each co-phasing matrix may be applied to a respective resource structure such as a PRB. For example, if four co-phasing matrices are generated (i.e., $W_2^{(0)}$, $W_2^{(1)}$, $W_2^{(2)}$, $W_2^{(3)}$), each co-phasing matrix is applied to a respective PRB of four PRBs such that $W_2^{(0)}$ is applied to a first PRB, $W_2^{(1)}$ is applied to a second PRB, $W_2^{(2)}$ is applied to a third PRB and $W_2^{(3)}$ is applied to a fourth PRB. In one or more embodiments, a co-phasing matrix is applied to at least a portion of or all REs of the PRB.

Figure 4:
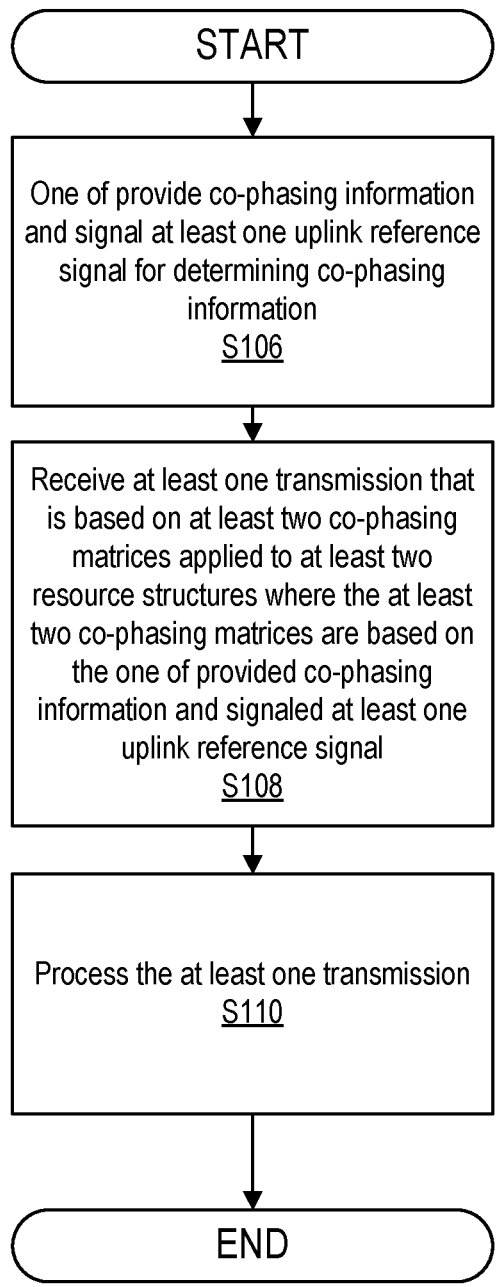
FIG. 4 is a flowchart of an exemplary process in a wireless device for facilitating transmission based on co-phasing matrices.

FIG. 4 is a flowchart of an exemplary process in a wireless device 14 of processing code 38 for facilitating transmission based on co-phasing matrices. Processing circuitry 32 is configured to one of provide co-phasing information and signal at least one uplink reference signal for determining co-phasing information, as described herein (Block S106). Processing circuitry 32 is configured to receive at least one transmission that is based on at least two co-phasing matrices applied to at least two resource structures where the at least two co-phasing matrices are based on the one of provided co-phasing information and signaled at least one uplink reference signal, as described herein (Block S108). Processing circuitry 32 is configured to process the at least one transmission, as described herein (Block S110).

Transparency for Wireless Device 14

For downlink (DL) beamforming on the physical downlink shared channel PDSCH, with a demodulation reference signal (e.g., Transmission Mode (TM) 8, TM9 and TM10), the wireless device 14 may perform channel estimation with the DMRS within a Physical Resource Block (PRB). In one or more examples, with the co-phasing and per PRB granularity described herein, a single co-phasing may be applied to all REs in one PRB. The co-phasing may be estimated as part of channel estimation such that there may be little to no impact on wireless device's channel estimation and demodulation.

Transmission Layer Balance in a Two Co-Phasing Matrix Example

In the dual layer transmission case, the first column of a first co-phasing matrix (i.e., $W_2^{(0)}$ is for a first transmission layer. For example, two co-phasing matrices for $N_c=2$ are given as follows:

$$W_2^{(0)} = \frac{1}{2}\begin{bmatrix} 1 & 1 \\ \varphi_l & -\varphi_l \end{bmatrix}, \text{ and}$$

$$W_2^{(1)} = \frac{1}{2}\begin{bmatrix} 1 & 1 \\ -\varphi_l & \varphi_l \end{bmatrix}$$

The first (leftmost) column of $W_2^{(0)}$, i.e., $$\begin{matrix} 1 \\ \varphi_l \end{matrix},$$

is for the first transmission layer. The second column of a second co-phasing matrix (i.e., $W_2^{(1)}$) is for a second transmission layer. Using the example above, the second (rightmost) column of $W_2^{(1)}$, i.e., $$\begin{matrix} 1 \\ \varphi_l \end{matrix},$$

is for the second transmission layer. If the co-phasing of first column of the first co-phasing matrix "favors" the first transmission layer in even PRBs, then the second column of the second co-phasing matrix favors the second layer in odd PRBs. For example, in some embodiments, the first column is for the first layer transmission, which might cause interference to the second layer, and the second column is for the second layer transmission, which might cause interference to the first layer. In one or more examples, "favors" may relate to gain such that the co-phasing of first column of the first co-phasing matrix favoring the first transmission layer may indicate that the first co-phasing of the first column provides higher gain to the first transmission layer than gain provided to the second transmission layer by the second column of the first co-phasing matrix. In the example, above, the two transmission layers may be considered well-balanced as the first (leftmost) column of the first co-phasing matrix favors or benefits the first transmission layer such as in terms of gain, while the second (rightmost) column of the second co-phasing matrix favors or benefits the second transmission layer such as in terms of gain. In other words, the overall gain and/or other transmission characteristic(s) of respective transmission layers may be equal to each other or within a predefined quantity of each other based on the application of the co-phasing matrices.

In case of more than two transmission layers, the transmission layer balance per layer group may be improved over other possible solutions by a 2-layer co-phasing per layer group. For example, if the first and second co-phasing matrix are applied to the first layer group, and the third and fourth co-phasing matrix are applied to the second layer group, then the layer balance may be improved per layer group. In one or more embodiments, the number of generated co-phasing matrices may correspond to a number of transmissions layers.

Performance

Figure 5:
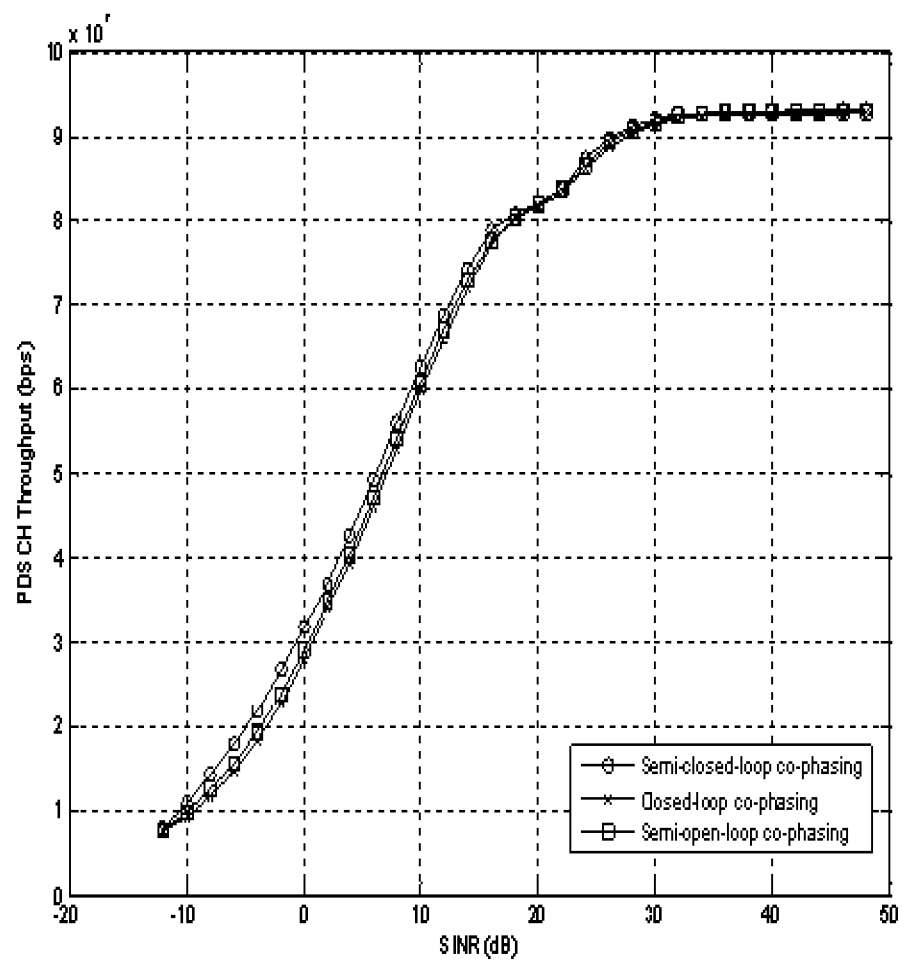
FIG. 5 is a diagram illustrating the performance of semi-closed-loop co-phasing with respect to existing closed-loop co-phasing and existing semi-open-loop co-phasing.

FIG. 5 is a diagram illustrating the performance of one or more examples of the semi-closed-loop co-phasing (described herein) in per PRB granularity compared with existing closed-loop co-phasing and existing semi-open-loop co-phasing. In the Extended Pedestrian A model (EPA5) channel with 64 antenna ports (64Tx, where the array has a configuration of 4×8×2 antenna elements), FIG. 5 illustrates that the semi-closed-loop co-phasing, described herein, outperforms existing closed-loop co-phasing and existing semi-open-loop co-phasing with respect to Physical Downlink Shared Channel (PDSCH) throughput (bits per second (bps)) and signal to noise ratio (SINR) in dB. This performance increase in the semi-closed-loop co-phasing when compared to existing co-phasing may be at least in part due to the ability of the semi-closed-loop co-phasing to achieve layer balance by co-phasing toggling as well as adapt to an actual phase difference by obtained co-phasing factors.

Therefore, unlike existing systems that rely on fixed co-phasing that may lead to imbalance (e.g., gain imbalance) between transmission layers, the teachings of the disclosure advantageously provide for dynamic and/or adaptive co-phasing such as by obtaining and using a co-phasing factor for determining co-phasing matrices to apply, thereby helping balance the transmission layers. For example, a first column of a co-phasing matrix is to be applied to the first transmission layer and the second column of the co-phasing matrix is for the second transmission layer. If the co-phasing of the first column favors the first transmission layer for even numbered PRBs, then the second column may favor the second transmission layer for odd numbered PRBs, thereby helping balance at least one characteristics (e.g., gain) of the two transmission layers. In some embodiments, "favor" may correspond to providing a higher gain. In one or more embodiments, the co-phasing factor may be updated based on an updated co-phasing factor.

A resource structure may generally represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure. A slot or mini-slot or a Physical Resource Block (PRB) or parts thereof may be considered other examples of a resource structure. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers. A resource pool or region or set may generally comprise one or a plurality (in particular, two or a multiple of two larger than two) of resources or resource structures. A resource or resource structure may comprise one or more resource elements (in particular, two or a multiple of two larger than two), or one or more PRBs or PRB groups (in particular, two or a multiple of two larger than two), which may be continuous in frequency.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for adaptive co-phasing in an Active Antenna System, AAS, for transmissions by a cross-polarization antenna array, the network node comprising processing circuitry including a processor and a memory, the memory containing instructions executable by the processor to configure the network node to:
    obtain co-phasing information associated with a wireless device;
    generate at least two co-phasing matrices based on the co-phasing information; and
    apply the at least two co-phasing matrices to at least two resource structures, the at least two resource structures being one of at least two physical resource blocks, PRBs, and at least two resource elements, Res, the applying of the at least two co-phasing matrices to the at least two resource structures being transparent to the wireless device receiving at least one transmission, and a sequence of applying the at least two co-phasing matrices to one of the at least two resource structures being chosen randomly by the network node.

2. The network node of claim 1, wherein the co-phasing information is obtained from a co-phasing index report associated with the wireless device.

3. The network node of claim 2, wherein the co-phasing index report indicates a value of a co-phasing factor used to generate the at least two co-phasing matrices.

4. The network node of claim 1, wherein the co-phasing information is obtained based on at least one uplink reference signal associated with the wireless device.

5. The network node of claim 1, wherein a first column of a first matrix of the at least two co-phasing matrices provides higher gain for a first transmission layer than a gain provided by a second column of the first matrix for a second transmission layer, the first transmission layer being different from the second transmission layer.

6. The network node of claim 1, wherein the at least two co-phasing matrices are generated by a phase rotation upon a base matrix formed with a co-phasing factor obtained from the co-phasing information.

7. The network node of claim 1, wherein a granularity of the applying of the at least two co-phasing matrices to the one of the at least two resource structures is indicated to the wireless device receiving at last one transmission.

8. A method for a network node for adaptive co-phasing in an Active Antenna System, AAS, for transmissions by a cross-polarization antenna array, the method comprising:
obtaining co-phasing information associated with a wireless device;
generating at least two co-phasing matrices based on the co-phasing information; and
applying the at least two co-phasing matrices to one of at least two resource structures, the at least two resource structures being one of at least two physical resource blocks, PRBs, and at least two resource elements, REs, the applying of the at least two co-phasing matrices to the at least two resource structures being transparent to the wireless device receiving at least one transmission, and a sequence of applying the at least two co-phasing matrices to one of the at least two resource structures being chosen randomly by the network node.

9. The method of claim 8, wherein the co-phasing information is obtained from a co-phasing index report associated with the wireless device.

10. The method of claim 9, wherein the co-phasing index report indicates a value of a co-phasing factor used to generate the at least two co-phasing matrices.

11. The method of claim 8, wherein the co-phasing information is obtained based on at least one uplink reference signal associated with the wireless device.

12. The method of claim 8, wherein a first column of a first matrix of the at least two co-phasing matrices provides higher gain for a first transmission layer than a gain provided by a second column of the first matrix for a second transmission layer, the first transmission layer being different from the second transmission layer.

13. The method of claim 12, wherein a second column of a second matrix of the at least two co-phasing matrices provides higher gain for the second transmission layer than the gain provided by a first column of the second matrix for the first transmission layer.

14. The method of claim 8, wherein the at least two co-phasing matrices are generated by a phase rotation upon a base matrix formed with a co-phasing factor obtained from the co-phasing information.

15. The method of claim 14, wherein the base matrix for single-layer transmission is formed by a 2×1 vector, a first element of which is equal to 1, and a second element of which is equal to the co-phasing factor.

16. The method of claim 14, wherein the base matrix for dual-layer transmission is formed by a 2×2 matrix, a first element of a first column being equal to 1, a second element of the first column being equal to the co-phasing factor, a first element of a second column being equal to 1, and a second element of the second column being the negative of the co-phasing factor.

17. The method of claim 14, wherein, in case of more than two layer transmission, the more than two layers are divided into dual-layer groups for even number of layers, and are divided into dual layer groups plus an additional layer for odd number of layers, and wherein at least two co-phasing matrices are generated per dual layer group.

18. The method of claim 14, wherein, if two co-phasing matrices are generated for two layers transmission, columns of the second matrix correspond to interchanged columns of the first matrix.

19. The method of claim 14, wherein if four co-phasing matrices are to be generated for two layers transmission, then columns of a third matrix correspond to interchanged columns of a first matrix, and columns of a fourth matrix correspond to interchanged columns of a second matrix.

20. A wireless device for receiving transmissions from a network node for adaptive co-phasing in an Active Antenna System, AAS, the wireless device comprising processing circuitry including a processor and a memory, the memory containing instructions executable by the processor to configure the wireless device to:
one of provide co-phasing information and signal at least one uplink reference signal for determining co-phasing information;
receive at least one transmission that is based on at least two co-phasing matrices applied to one of at least two resource structures, the at least two co-phasing matrices being based on the one of provided co-phasing information and signaled at least one uplink reference signal, the at least two resource structures being one of at least two physical resource blocks, PRBs, and at least two resource elements, REs, the applying of the at least two co-phasing matrices to the at least two resource structures being transparent to the wireless device receiving at least one transmission, and a sequence of applying the at least two co-phasing matrices to one of the at least two resource structures being chosen randomly by the network node; and
process the at least one transmission.

21. A method for a wireless device for receiving transmissions from a network node for adaptive co-phasing in an Active Antenna System, AAS, the method comprising:
one of providing co-phasing information and signaling at least one uplink reference signal for determining co-phasing information;
receiving at least one transmission that is based on at least two co-phasing matrices applied to one of at least two resource structures, the at least two co-phasing matrices being based on the one of provided co-phasing information and signaled at least one uplink reference signal and the at least two resource structures being one of at least two physical resource blocks, PRBs, and at least two resource elements, REs, the applying of the at least two co-phasing matrices to the at least two resource structures being transparent to the wireless device receiving at least one transmission, and a sequence of applying the at least two co-phasing matrices to one of the at least two resource structures being chosen randomly by the network node; and
processing the at least one transmission.

* * * * *